Patented Dec. 17, 1940

2,225,419

UNITED STATES PATENT OFFICE 2,225,419

PROCESS FOR THE CONVERSION OF 17-CIS-ALCOHOLS OF THE CYCLOPENTANOPOLY-HYDROPHENANTHRENE SERIES INTO THE CORRESPONDING 17-TRANS-ALCOHOLS

Willy Logemann and Heinrich Koester, Berlin-Charlottenburg, Germany, assignors to Schering Corporation, Bloomfield, N. J., a corporation of New Jersey No Drawing. Application February 25, 1938, Serial No. 192,646. In Germany March 1, 1937

9 Claims. (Cl. 260—397)

In the reduction of sexual hormones containing keto groups into the corresponding alcohols—for instance, in the reduction of oestrone, dehydroandrosterone, transandrosterone, and the like—mixtures of isomeric alcohols are formed which differ only as to the position of the OH group which is formed by the reduction at the carbon atom 17. Thus, from oestrone are produced cis-oestradiol wherein the OH group at the carbon atom 17 and the adjacent methyl group are in cis-position with respect to each other, as well as trans-oestradiol wherein the said groups are in trans-position.

It is possible by suitable selection of the reduction conditions to shift the equilibrium of the reaction products in favor of one or the other isomer, but it is impossible to absolutely prevent the formation of one of them. As the two isomers are materially different with respect to their physiological properties—the activity of cis-oestradiol being only about one-half to two-thirds of the activity of trans-oestradiol—this, hitherto inevitable formation of the less active isomer is equivalent to a loss of physiological units, and consequently a process aiming at the reduction, or elimination, of this loss is of considerable technical importance.

It has now been found that this object is achieved by operating in a closed cycle according to the present invention, i. e. re-oxidizing into the corresponding ketone the less active isomer produced by reduction, and again reducing this ketone, with or without the addition of fresh ketone.

The following reaction diagrams illustrate the process as applied to oestradiol and androstendiol, R standing for the hydroxyl group or a group that can be converted into a hydroxyl group, such as an ester- ether-, amino-group or halogen.

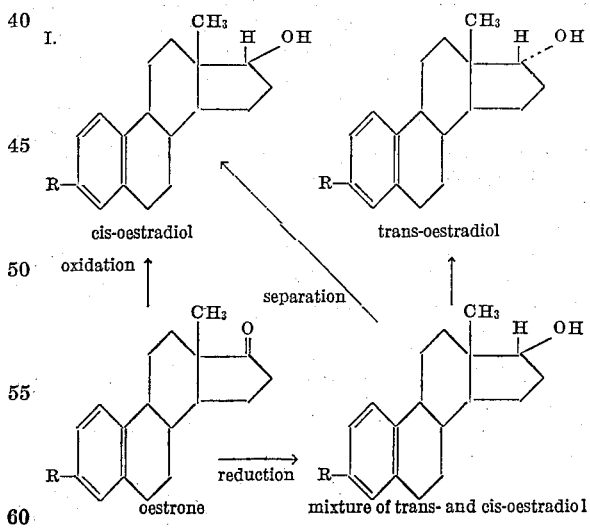

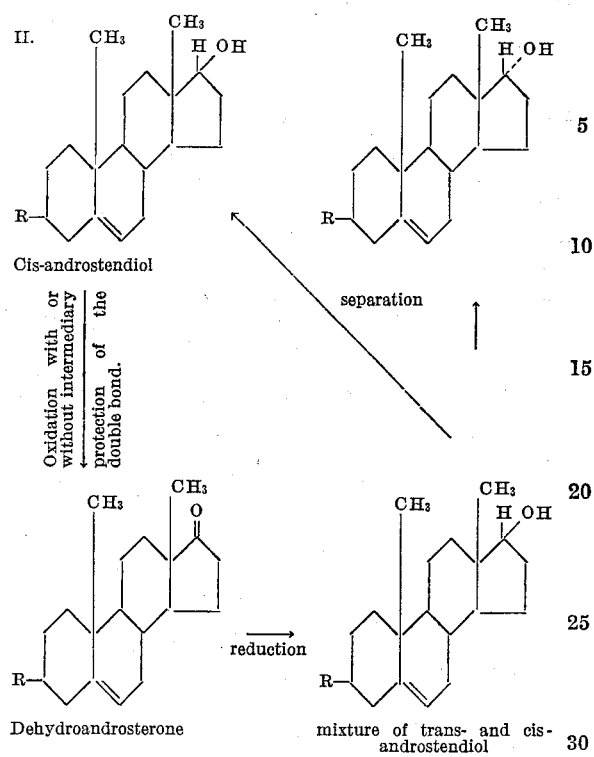

For the oxidation according to the present invention, all oxidation agents are suitable which are capable of converting a secondary alcohol group into a keto group. A particularly suitable agent for this purpose is chromic acid anhydride.

When it is desired to reconvert the oestradiol into oestrone, it is necessary to protect during the oxidation the phenolic hydroxyl group intermediarily by transforming it into a group which is readily reconvertible into the hydroxyl group, for instance, by conversion into inorganic or organic esters, ethers, or the like. A particularly suitable expedient is benzoylisation of the phenolic hydroxyl group in the oestradiol. The reaction can obviously also be used for the derivatives of the starting materials the only condition for the reaction being that a free hydroxyl group be positioned at the carbon atom 17.

The invention will be more fully understood from the following examples which, however, are not to be interpreted as limiting the scope of the invention.

*Example 1*

0.36 gram of a mixture of cis- and trans-oestradiol-3,17 are dissolved in 100 ccs. of 5% aqueous potassium hydroxide solution, whereupon 2.7 grams of benzoyl chloride are added drop by drop while stirring. The benzoylated product is precipitated and, after being filtered off, is dissolved in 100 ccs. of glacial acetic acid, and a solution of 106 mg. of chromic acid (1.2 mol) in 100 ccs. of glacial acetic acid is added drop by drop at room temperature. The mixture is allowed to stand until the next day and is then poured into water in the proportion of five times its own quantity. The whole is extracted with ether and the ethereal solution is washed with sodium carbonate solution and water, freed from water and evaporated to dryness. The residue melts at 200–210° C. After recrystallisation from alcohol pure oestronmonobenzoate is obtained; the yield amounts to 70–80%.

This product is hydrogenated directly, or after saponification in known manner, into oestradiol-monobenzoate or oestradiol. If the reduction conditions have been suitably selected, about 85% of trans-oestradiol are formed, and only 15% of the less active cis-oestradiol. Consequently, the original contents of cis-oestradiol in the mixture are reduced by the process according to the invention from about 15% to only about 1.5%.

*Example 2*

2.90 grams of androsten-3-trans-17-cis-diol, as obtained, for instance, by hydrogenating dehydroandrosterone, are heated in the presence of 6.8 grams of aluminium isopropylate and 196 grams of anhydrous cyclohexanone for half an hour, at 100° C. The reaction product is then subjected to steam distillation, the residue of distillation is taken up with ether, and the ethereal solution is evaporated. A crystalline product is obtained which upon recrystallization from hexane yields 2.4 grams of androstendione of M. P. 171° C. This, upon reduction in known manner, yields a mixture of 17-cis- and 17-trans-androstendiols, from which the cis-compound is separated and re-oxidized.

*Example 3*

2.90 grams of androsten-3-trans-17-cis-diol are dissolved in 600 ccs. of glacial acetic acid and a solution of 1.59 grams of bromine in 100 ccs. of glacial acetic acid is added drop by drop while cooling. Then 120 ccs. of chromic acid solution (3.6 mol $O_2$ for 1 mol androstendiol) are added drop by drop within ten hours. After the mixture has been allowed to stand for some time, the reaction product is debrominated with 6 grams of zinc dust during ten hours at room temperature, and the mixture is poured into water. The portion which has been extracted with benzene is washed with alkali and water and, after the solvent has been evaporated, leaves a solid residue from which by crystallisation from hexane 1.92 grams of androstendione of M. P. 171° C. are isolated. This product, as described in Example 2, is again hydrogenated into a diol mixture.

*Example 4*

3.30 grams of androsten-3-trans-17-cis-diol-3-acetate are heated in the presence of 98 grams of anhydrous cyclohexanone, and 3.4 grams of aluminium isopropylate for half an hour to 100° C. The mixture is then steam distilled, diluted sulphuric acid is added to the residue, and the residue is extracted with ether. The ethereal solution is evaporated to dryness and the residue is crystallized from methanol; thereby 2.77 grams of dehydroandrosterone acetate of M. P. 168° C. are obtained which by reduction can be reconverted into a mixture of 17-cis- and 17-trans-diol acetate.

*Example 5*

To a solution of 1.7 grams of 3-trans-17-cis-androstendiol in 400 ccs. of glacial acetic acid, a solution of 1 mol bromine in 200 ccs. of glacial acetic acid is added drop by drop at low temperature. After the solution has become quite colorless, 100 ccs. of a solution of chromic acid (1.2 mol atoms O for 1 mol dibromide) are added drop by drop within eight hours. Then, 5 grams of zinc dust are added and the mixture is stirred for eight hours at 10–20° C. The reaction mixture is now filtered, the filtrate is poured into water and extracted with benzene. After washing and evaporating the benzene solution, the residue is taken up with alcohol and precipitated with a 4% solution of digitonine while warming. About 6 grams of digitonide are precipitated. After splitting in pyridine with ether, 1.1 grams of a product are obtained which upon recrystallisation from ether melts at 148° C. and is identical with dehydroandrosterone. This product, by known methods can again be reduced into a mixture of isomeric diols.

Of course, various other modifications and changes in the processes and reagents may be made by those skilled in the art in accordance with the principles set forth herein and in the claims annexed hereto.

What we claim is:

1. Process for the conversion of 17-cis-alcohols of the cyclopentanopolyhydrophenanthrene series into the corresponding 17-trans-alcohols, comprising oxidizing the cis-alcohol with an agent capable of converting the alcohol group into a keto group, reducing the keto compound so produced, whereby a mixture of trans- and cis-alcohols is obtained, and separating the cis-isomer; the 3-hydroxyl group, in the case of 3,17 diol starting compounds having an aromatic first ring, being blocked off by replacement with a group reconvertible into hydroxyl to prevent oxidation thereof.

2. Process according to claim 1, wherein cis-oestradiol is used as starting material.

3. Process according to claim 1, wherein the oxidation is effected with chromic acid.

4. Process according to claim 1, wherein the starting material is unsaturated and wherein the double bonds are protected intermediarily from the oxidation agent, by the addition of halogen.

5. Process according to claim 1, wherein the starting material has a hydroxyl group present in the molecule besides the hydroxyl group to be oxidized, and wherein such additional hydroxyl group is protected from the oxidation agent by conversion into a group which is readily reconvertible into the hydroxyl group.

6. Process according to claim 1, wherein the oxidation is effected by treatment with an excess of a member of the group consisting of ketones and aldehydes in the presence of a metal alcoholate.

7. Process according to claim 1, wherein the oxidation is effected by treatment with an excess of a member of the group consisting of ketones and aldehydes in the presence of an aluminium alcoholate.

8. Process according to claim 1, wherein the 17-cis-alcohol is androsten-3-trans-17-cis-diol.

9. Process according to claim 1, wherein the 17-cis-alcohol is the 3-ester of androsten-3-trans-17-cis-diol.

WILLY LOGEMANN.
HEINRICH KOESTER.